Figure 1:
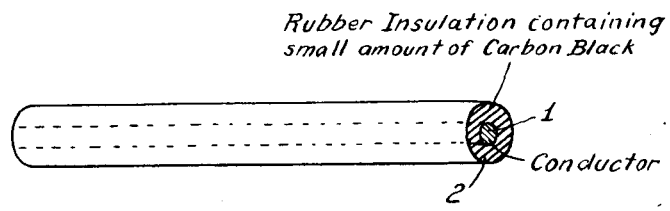

Dec. 5, 1933.  W. B. WIEGAND  1,938,308
ELECTRICAL INSULATION
Filed March 10, 1930

INVENTOR
*William B. Wiegand,*
BY
Pennie, Davis, Marvin & Edmonds.
ATTORNEYS

Patented Dec. 5, 1933

1,938,308

UNITED STATES PATENT OFFICE 1,938,308

ELECTRICAL INSULATION

William Bryant Wiegand, Sound Beach, Conn., assignor to Binney & Smith Company, New York, N. Y., a corporation of New Jersey Application March 10, 1930. Serial No. 434,832

6 Claims. (Cl. 173—264)

My invention relates to improvements in the compounding of rubber for electrical insulation; my invention includes new rubber insulating products and a method of improving electrical properties of rubber insulating compounds.

Hitherto, the presence of carbon black in rubber insulating compounds has been regarded as detrimental because of its conducting properties, and, so far as I am aware, carbon black has never intentionally been added as such to rubber insulating compounds. Reclaimed rubbers containing carbon black derived from the reclaimed compound or added during the reclaiming operation have, to some extent, been included in rubber insulating compounds; but in such instances the carbon black has not been added as such to the insulating compounds, only as an incidental component of the reclaimed rubber.

I have discovered, contrary to the accepted practice of excluding carbon black as such from insulating compounds, that certain electrical properties of rubber insulating compounds are improved by an appropriately limited addition of carbon black as such. In the practice of my invention, to secure the advantages of my invention, the carbon black must be added to the rubber insulating compound as such, that is, the carbon black must have when incorporated in the insulating compound the adsorptive capacity of raw uncompounded carbon black. Also, the carbon black is best substantially free from moisture.

To illustrate: I have discovered that the electrical breakdown strength of some rubber insulating compounds can be increased, for example, by as much as 10–40% or more by the addition, for example, of 2–4% by weight, on a compound containing, for example, 20–40% of rubber, of carbon black as such. In referring to "breakdown strength", I refer to the minimum value of applied electrical potential per unit of thickness under which the insulating compound will rupture.

Further to illustrate: I have discovered that some rubber insulating compounds can be improved with respect to power factor by the addition, for example, of 3–4% by weight, on a compound containing, for example, 20–40% of rubber, of carbon black as such. In referring to "power factor", I refer to the tendency of the insulating compound to dissipate electrical energy when subjected to alternating potential.

Still further to illustrate: I have discovered that the resistivity of some rubber insulating compounds can be increased, for example, by as much as 50% or more by the addition, for example, of 2–4% by weight, on a compound containing, for example, 20–40% of rubber, of carbon black as such. In referring to "resistivity", I refer to the specific resistance per unit of thickness of the insulating compound.

So far as I can determine, this unexpected result seems to be due to the adsorptive capacity of the carbon black. With the utmost care, the absolute exclusion of water and even electrolytic constituents probably is never accomplished, with the result that water and electrolytes, perhaps in but the most minute amounts, are always present. Apparently the adsorption of such electrolytes renders them less active as a deteriorating influence with respect to electrical properties of the insulating compound while the advantage so secured by the adsorption of such electrolytes on added carbon black overbalances, within limits, any disadvantage incident to the addition of the carbon black. The rendering of such adsorbed electrolytes less active may in part, be due to the conducting properties of the carbon black. However, I do not predicate my invention upon this or any other hypothesis.

Whatever the explanation, I have found that electrical properties of rubber insulating compounds are improved by an appropriately limited addition of carbon black. The exact proportion of carbon black to be used for best results varies with different compounds and, probably, with compounds of different purity. Also, the several electrical properties of the insulating compound are not uniformly affected so that the proportion depends in some cases upon the property to be brought to optimum value. The best proportion apparently approximates that just sufficient to absorb electrolytes present in the insulating compound. Best results are usually secured with an amount of carbon black approximating up to 10% by weight on the rubber content of the compound (crude rubber plus the rubber content of any reclaimed rubber in the compound); and usually not substantially exceeding 3% by weight on the compound, although optimum values are sometimes secured with an amount of carbon black exceeding 3% but not substantially exceeding 6% by weight on the compound.

As the amount of carbon black incorporated in the insulating compound is increased, the effect of its conducting properties becomes apparent in rendering the compound of diminishing value as electrical insulation, in conformity with the principle of accepted practice, but with appropriately limited additions, in accordance with my invention, this effect, if is exists, disappears in the improvements effected by the addition. My invention is directed to that limited range of additions within which the important electrical property or properties are improved by the addition of carbon black as compared to such property or properties of the compound without the carbon black.

It is conceivable that a rubber compound might be so poor, electrically, without the addition of carbon black, that improvement, with respect to certain electrical properties, such as electrical breakdown strength or power factor, for example, might still be noted with additions of carbon black so large as to make the compound useless as electrical insulation because of the total proportion of carbon black, coupled with its original poor quality, but such compounds are excluded from my invention since they have no practical significance, and are not suitable, as electrical insulation.

The following illustrative rubber insulating compounds will exemplify the invention:

984.6 rubber (smoked sheets)
30.0 zinc oxide
29.0 carbon black
3.5 tetra methyl-thiuram-monosulfide
40.0 sulfur This insulating compound includes about 2.9% by weight on the rubber and about 2.7% by weight on the compound of carbon black added as such; this insulating compound is a particularly advantageous embodiment of my invention.

974.3 rubber (smoked sheets)
30.0 zinc oxide
48.3 carbon black
3.5 tetra methyl-thiuram-monosulfide
40.0 sulfur This insulating compound includes about 5.0% by weight on the rubber and about 4.4% by weight on the compound of carbon black added as such.

409.0 rubber (smoked sheets)
250.0 champion reclaim (acid-reclaimed rubber)
90.0 zinc oxide
200.0 mineral rubber
5.8 anti-oxidant (agerite)
20.0 carbon black
1.0 tetra methyl-thiuram-monosulfide
22.0 sulfur This insulating compound includes about 3.9% by weight on the rubber and about 2.0% by weight on the compound of carbon black added as such; this insulating compound is a particularly advantageous embodiment of my invention.

409.0 rubber (smoker sheets)
250.0 champion reclaim (acid-reclaimed rubber)
30.0 zinc oxide
200.0 mineral rubber
5.8 anti-oxidant
40.0 carbon black
1.0 tetra methyl-thiuram-monosulfide
22.0 sulfur This insulating compound includes about 7.9% by weight on the rubber and about 4.2% by weight on the compound of carbon black added as such.

400.0 rubber (smoked sheets)
250.0 Philadelphia #200 reclaim (alkali-reclaimed rubber)
218.0 zinc oxide
5.8 anti-oxidant
15.5 carbon black
10.0 master batch-accelerator
22.0 sulfur This insulating compound includes about 2.8% by weight on the rubber and about 1.4% by weight on the compound of carbon black added as such; this insulating compound is a particularly advantageous embodiment of my invention.

400.0 Rubber (smoked sheets)
250.0 Philadelphia #200 reclaim (alkali-reclaimed rubber)
172.5 zinc oxide
200.0 mineral rubber
5.8 anti-oxidant
31.0 carbon black
10.0 master batch-accelerator
22.0 sulfur This insulating compound includes about 5.6% by weight on the rubber and about 2.8% by weight on the compound of carbon black added as such; this insulating compound is a particularly advantageous embodiment of my invention.

400.0 Rubber (smoked sheets)
250.0 Philadelphia #200 reclaim (alkali-reclaimed rubber)
126.0 zinc oxide
200.0 mineral rubber
5.8 anti-oxidant
46.5 carbon black
10.0 master batch-accelerator
22.0 sulfur This insulating compound includes about 8.5% by weight on the rubber and about 4.4% by weight on the compound of carbon black added as such.

The foregoing insulating compounds are in parts by weight. The master batch-accelerator component of each of the last three compounds consists of a mixture of 90% of rubber and 10% of tetra methyl-thiuram-monosulfide by weight. The anti-oxidant component of each of the last five compounds is a condensation product of acetaldehyde and alphanaphthylamine. Each of the foregoing insulating compounds may be applied to wire, for example, and vulcanized thereon in the conventional manner. The vulcanization may correspond, for example, to a platen press cure of twenty-five minutes at 270° F.

The invention is of special value and application in connection with insulating compounds including alkali-reclaimed rubber; the invention seems to be peculiarly effective in effecting improvement of such insulating compounds.

The invention also has another advantage in insulating compounds including zinc oxide. In such compounds, the carbon black added as such to the compound in accordance with my invention may be substituted for an equal absolute volume of zinc oxide in the compound, the carbon black thus replacing zinc oxide in the insulating compound as well as effecting improvement in electrical properties. A substantial economy may thus be effected since carbon black is much less expensive than zinc oxide as a compounding material.

The invention has important advantages in another aspect. In many instances the physical properties of an insulating compound are of equal importance with its electrical properties. Carbon black, within the range of proportions used in accordance with this invention, materially improves the tensile strength, toughness, resilience, tear resistance and resistance to abrasion of rubber insulating compounds. In this aspect the invention provides for joint improvement of physical and electrical properties of insulating compounds. In particular, in this aspect the invention provides for improvement of physical properties of rubber insulating compounds applied directly to wire, or other conductor, where such improvement is normally difficult or impossible of attainment because the electrical properties are particularly important.

The invention is further illustrated by reference to the annexed drawing which represents conventionally two types of insulated electrical conductors contemplated by my present invention. It is to be understood, however, that this further illustration is for exemplification only and my invention is not limited thereby.

Fig. 1 of the drawing represents one aspect of my invention in accordance with which a layer of my improved rubber insulation 2 is applied directly to the electrical conductor 1.

Figure 2:
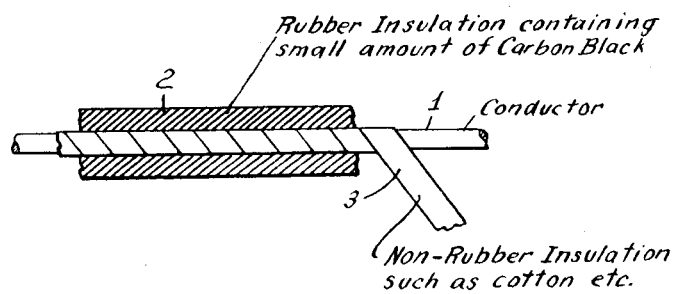

Fig. 2 represents a modification of my invention in accordance with which the electrical conductor 1 is not in direct contact with my improved rubber insulating material 2 but is separated therefrom by a layer of non-rubber insulation material 3, for instance cotton or the like.

In referring to "carbon black," I intend to distinguish from "lamp black". It is with appropriately limited additions of carbon black as such that the advantages of the invention are secured. Of the commercial carbon blacks, "Micronex", for example, is suitable for the practice of my invention and "Micronex" may be used with advantage in the foregoing illustrative insulating compounds.

As previously mentioned, in the practice of my invention and to secure the advantages of my invention, the carbon black must be added to the rubber insulating compound in its raw state, i. e., the carbon black must have, when incorporated in the insulating compound, the adsorptive capacity of raw uncompounded carbon black. To illustrate; Philadelphia #200 reclaim, mentioned as a component of the last three of the foregoing illustrative insulating compounds, includes about 7.5% by weight of carbon black. This carbon black, however, is not effective for the purpose of my invention, apparently because its adsorptive capacity has been exhausted in the reclaimed compound. Carbon black so added to the insulating compound as an incidental compound of reclaimed rubber is not raw carbon black, or carbon black added as such in accordance with my invention. It is to make this distinction that I refer, in the claims, to "raw carbon black."

The process of my invention comprises the addition of carbon black as such to rubber insulating compounds in amount just sufficient to improve or to bring to optimum value the important electrical property or properties; for example, sufficient to reduce the power factor of the compound to a minimum or to make it less than that of the compound without the carbon black, or sufficient to increase the breakdown strength of the compound to a maximum or to make it greater than that of the compound without the carbon black, or sufficient to increase the resistivity of the compound to a maximum or to make it greater than that of the compound without the carbon black. The process of my invention also comprises the addition of carbon black as such to rubber insulating compounds in amount appropriate to secure, jointly with such improvement of the important electrical property or properties, improvement of physical properties of the insulating compound.

I claim:

1. An electrical conductor having a rubber insulation thereon, the rubber nearest the conductor containing dry raw carbon black in amount not substantially less than 1.4% and not substantially exceeding 3% by weight on the compound.

2. An electrical conductor having a rubber insulation thereon, the rubber nearest the conductor containing dry raw carbon black in amount not substantially less than 1.4% and not substantially exceeding 6% by weight on the compound.

3. An electrical conductor having a rubber insulation thereon, the rubber nearest the conductor containing dry raw carbon black in amount not substantially less than 1.4% and not substantially exceeding 10% by weight on the compound.

4. An electrical conductor insulated primarily by rubber, the major portion of said rubber insulation containing dry raw carbon black in an amount not substantially less than 1.4% and not substantially exceeding 3% by weight on the compound.

5. An electrical conductor insulated primarily by rubber, the major portion of said rubber insulation containing dry raw carbon black in an amount not substantially less than 1.4% and not substantially exceeding 6% by weight on the compound.

6. An electrical conductor insulated primarily by rubber, the major portion of said rubber insulation containing dry raw carbon black in an amount not substantially less than 1.4% and not substantially exceeding 10% by weight on the compound.

WILLIAM BRYANT WIEGAND.